No. 809,845.
PATENTED JAN. 9, 1906.
R. E. ROSEWARNE.
VARIABLE SPEED MECHANISM.
APPLICATION FILED JULY 13, 1905.
3 SHEETS—SHEET 1.
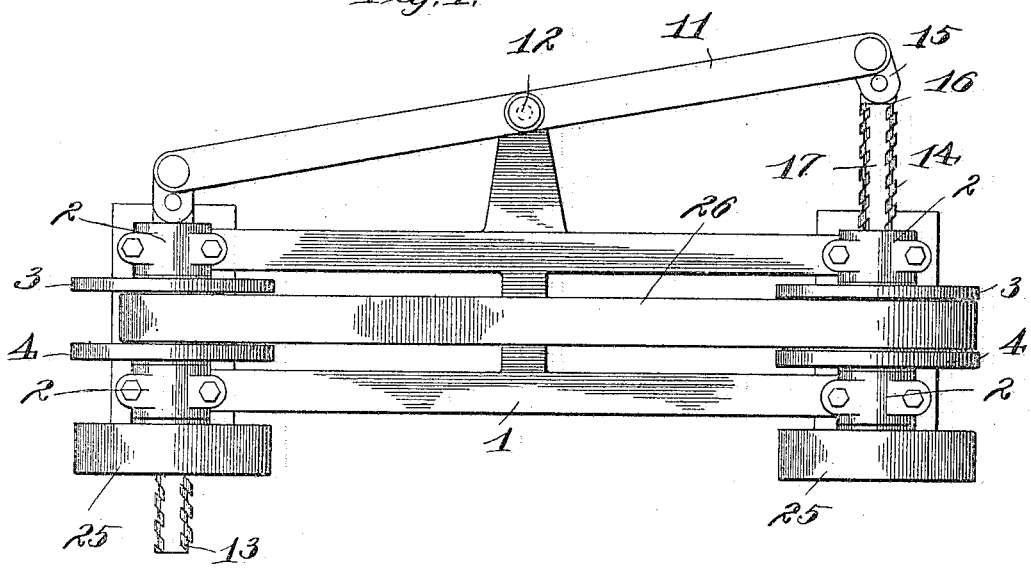
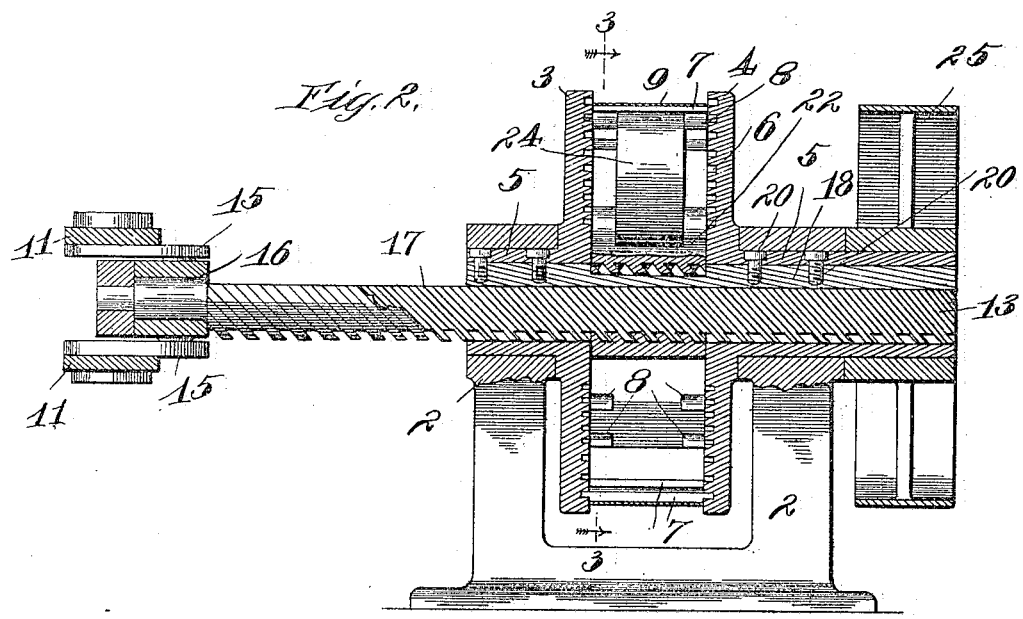

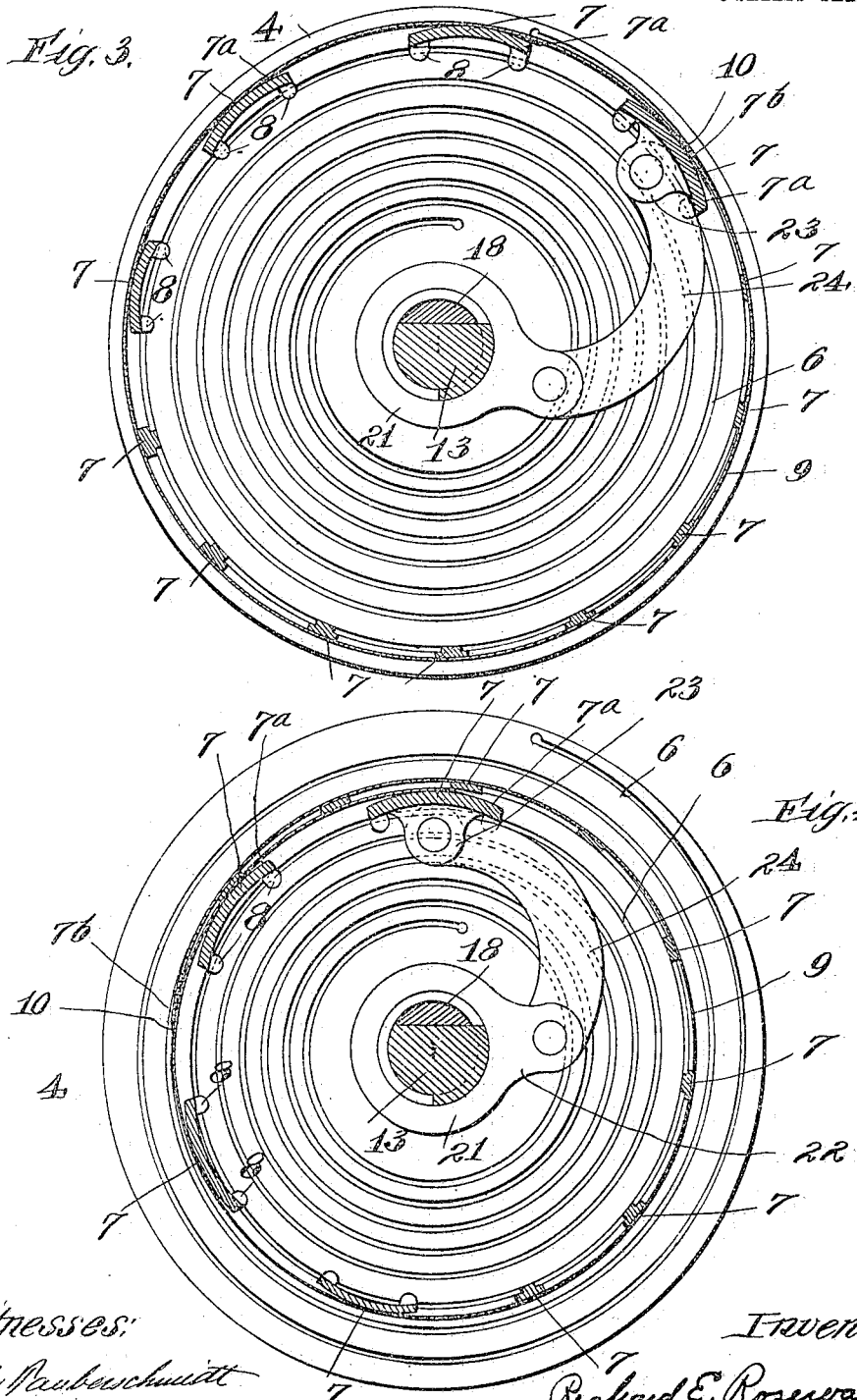

No. 809,845. PATENTED JAN. 9, 1906.
R. E. ROSEWARNE.
VARIABLE SPEED MECHANISM.
APPLICATION FILED JULY 13, 1905.

3 SHEETS—SHEET 3.

Witnesses:
Inventor
Richard E. Rosewarne,
by Knight Bros.
Attys.

UNITED STATES PATENT OFFICE.

RICHARD E. ROSEWARNE, OF COVINGTON, KENTUCKY.

VARIABLE-SPEED MECHANISM.

No. 809,845.          Specification of Letters Patent.          Patented Jan. 9, 1906.

Application filed July 13, 1905. Serial No. 269,530.

*To all whom it may concern:*

Be it known that I, RICHARD E. ROSEWARNE, a citizen of the United States, and a resident of Covington, in the county of Kenton and State of Kentucky, have invented certain new and useful Improvements in Variable-Speed Mechanisms, of which the following is a specification.

This invention relates to variable-speed mechanisms, and more particularly to mechanisms of this type employing a pair of expansible pulleys over which travels an endless belt.

It has for an object to provide an expansible continuous rim-pulley of volute form, upon which the belts can run in a naturally flat position, avoiding the use of cones with their straining effect upon the sides of the belt due to the angular position of the cone, with consequent unequal speed upon the belt, which speed must be equalized at the expense of the life of the belt, avoiding the end thrust common to devices having belts running between steep angular disks, and avoiding shock and wear on the belt caused by the use of flat rims having broken or interrupted surfaces.

A further object is to provide an expansible pulley having on its periphery means for providing positive engagement with the element engaging therewith.

A still further object is to provide mechanism for expanding and contracting the pulley while it is at rest or when operating under load, the regulation of the expansion and the contraction being of the most sensitive and reliable nature and adapted for either a set position or for progressive variations. Means is also provided for regulating the expansion and the contraction of the pulley to agree with the position of the engaging portions of the belt, so that the teeth will always be in proper position for engagement by the belt.

Other and further objects will appear in the following description and will be more particularly pointed out in the appended claims.

Figure 5:
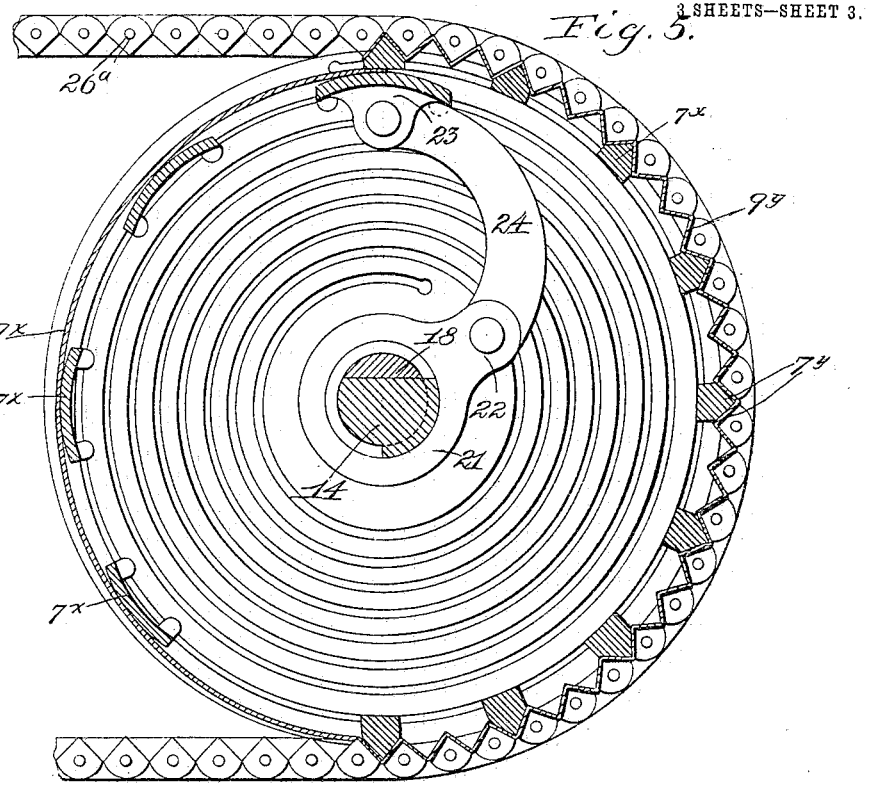
Figure 6:
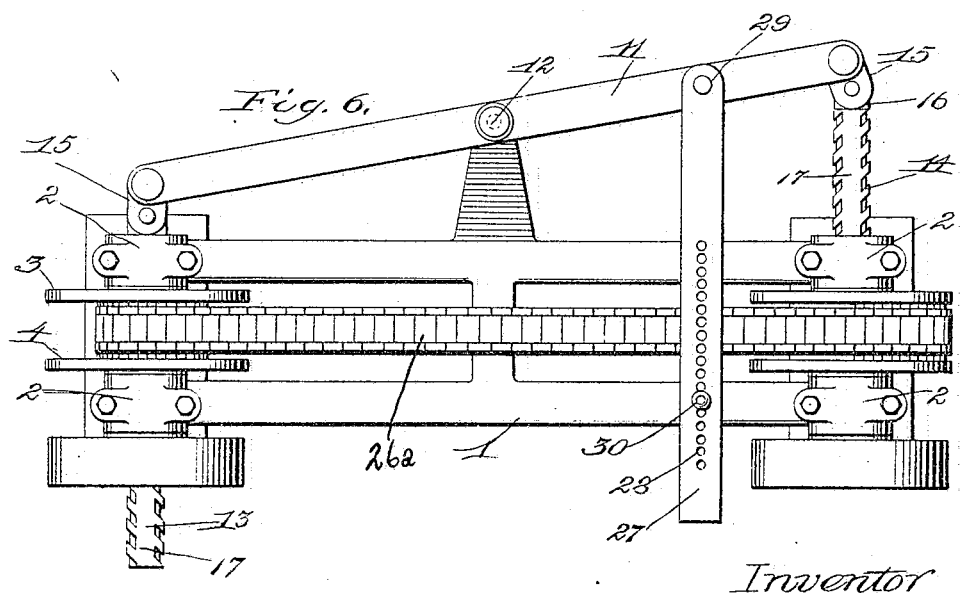

In the drawings, Figure 1 is a top plan view of one embodiment of my invention. Fig. 2 is a diametrical section through one of the pulleys. Fig. 3 is a section on the line 3 3, Fig. 2. Fig. 4 is a like section with the pulley contracted. Fig. 5 is a view similar to Fig. 3 of another embodiment of my invention. Fig. 6 is a view similar to the embodiment of my invention illustrated in Fig. 5.

In both embodiments upon each end of a frame 1 is located a pair of spaced standards or bearings 2, each pair of which has journaled thereon a pulley composed of a pair of disks 3 and 4. The disks are each provided on one face with hollow bearings 5 and have their other and opposed faces grooved spirally to provide tracks 6, the centers of the spiral gradually increasing in width as the spiral circles from its smallest to its largest groove, according to the ratio of diameters determined upon—in this instance being two to one.

In the embodiment shown in Figs. 1 to 4 a series of differential bars or supports 7 connects opposed faces of the disks, each bar having bearings 8 at each end adapted to travel in the spiral grooves 6. The bars or supports 7 gradually increase in height from the one nearest the outer end of the grooves to the one nearest the inner end of the grooves, the latter being double the height of the middle one, for when the pulley is reduced to one-half the largest diameter the middle bar directly underlies the outermost bar, and accordingly the inner bars must be adapted to pass under the height given the middle bar. The inner four bars have a convex surface $7^a$ to adapt them to pass beneath the other bars when the pulley is in the smallest position, while the outer bars are depressed and concaved at $7^b$, whereby they may fit the smallest diameter of the underlying portion of the rim, to be hereinafter described. Secured to the bars or supports 7 is a rim 9 in the form of a volute strip of yieldable material—as, for instance, spring metal—one end being secured to the outer bar and beveled at 10 to effect an easy curved union with the underlying portion of the rim and the other end being secured to the inner bar. The shape and the size of the bars or supports 7 and the shape of the grooves or tracks cause the rim in all positions to be concentric.

In the embodiment illustrated in Figs. 5 and 6 the supports or bars $7^x$ have bearings adapted to travel in the spiral groove 6, and some of these bars—that is, the ones nearest the outer end of the grooves—being beveled on each side, as at $7^y$. A volute rim $9^x$ surrounds the bars or supports and is corrugated near its outer ends, so as to provide teeth $9^y$ throughout a distance equal to substantially one-half of the length of the rim, the beveled bars $7^x$ fitting within certain of the corrugations to act as a support therefor. The other portion of the rim is smooth and serves as a support for the chain or other transmitting element. Owing to the fact that the teeth extend one-half way around the rim when the rim is in its greatest expanded position, the rim is permitted to expand and contract and the transmission element is at all times in engagement with some of the teeth, thereby insuring a positive drive between the parts in every position of the rim.

In both embodiments the two pulleys are simultaneously operated by a lever 11, pivoted intermediate its ends at 12 to the frame 1 and secured at its ends to a pair of screws 13 and 14 by means of a pair of links 15, which are each pivoted at one of their ends to the ends of the lever and at the other of their ends to a sleeve or collar 16 on each of the screws. Each screw has an axial interrupted portion or keyway 17 and works through the bearings 5 of the pair of disks 3 and 4, being held against turning within the bearings by means of a key 18. This key permits the screw to be moved axially and is itself held against movement by holding-screws 20. Surrounding each screw and between each pair of disks is an internally-threaded nut or rotary member 21, which carries a projection 22, connected to a projection 23 on the inner bar or support 7 by means of a curved arm or link 24. Thus it will be seen that I have produced a volute rim which is wound and unwound from one end of the same. On the end of one of the hollow bearings 5 of each pulley is keyed a drum member 25, which may be employed as the driving or driven member.

In the embodiment shown in Figs. 1 to 4 a plain flat belt 26 connects the two pulleys and acts as a transmitting element between them, while in the embodiment shown in Figs. 5 and 6 a belt $26^a$ in the form of a sprocket-chain is employed. The means for adjusting the pulleys in the latter embodiment is the same as the former, except that a rod 27, provided with a series of perforations 28, is pivoted at 29 to one arm of the lever 11 and a pin 30 is adapted for insertion through any one of the perforations 28 into a perforation in the frame 1. This rod 27, with pin 30, forms means for accurately regulating the expansion and the contraction of the pulley to agree with the positions of the engaging portions of the belt, so that the teeth will always be in proper position for engagement by the belt. Power is applied to either of drums 25 to rotate one of the pulleys, which transmits its motion to the other pulley through the medium of the transmitting element 26 or $26^a$. If it is desired to change the speed, the lever 11 is moved in one direction to contract the driving-pulley and expand the driven pulley and decrease the speed and in the other direction to increase the speed. Each screw moves axially through its pulley, causing the rotation of its nut 21 and through the medium of link 24 causes rim 9 or $9^a$ to move to and from the axis of the pulley and within the spiral tracks 6. While the bars or supports 7 or $7^x$ are preferred as a support for the volute rim, it is apparent that any other means for mounting the rim may be employed. Further, the construction of the mechanisms for expanding and contracting the pulley and regulating this action may be varied.

Having thus described my invention, what I claim is—

1. In an expansible pulley, a volute rim, spiral guides on opposite sides of the rims, and means engaging the rim for moving it on the guides while the guides are held stationary, to expand and contract the pulley.

2. In an expansible pulley, a rim, spiral guides on the opposite sides of the rim, and means engaging the rim at one end only to wind and unwind the same.

3. In an expansible pulley, a rim, and mechanical means engaging the rim at the inner end only to wind and unwind the same.

4. In an expansible pulley, the combination with a pair of members each having a spiral track thereon, of a plurality of bars supported at opposite ends on tracks and adapted to travel thereon, said bars gradually increasing in height from the outer end of the spirals to the inner ends, means connecting said bars, and means engaging the inner bar to cause the bars to travel on the tracks.

5. In an expansible pulley, the combination with a pair of members having spiral tracks thereon, of a plurality of bars supported at opposite ends on the tracks and adapted to travel thereon, means connecting the bars, and means engaging only the inner bar to cause the bars to travel on the tracks.

6. In an expansible pulley, the combination with a pair of members having spiral tracks thereon, of a continuous rim guided by said tracks, to expand and contract the pulley, and means engaging only the inner end of the rim to expand and contract the pulley.

7. In an expansible pulley, the combination of a pair of members having spiral tracks thereon, supports of varying height adapted to travel on said tracks, an expansible rim surrounding the supports, and means engaging the rim to cause it to travel on the track members while the track members are stationary.

8. The combination with a pair of spiral track members, of a rim, a plurality of connected bars adapted to travel on said tracks, a rotary member mounted between the spiral members, a link connecting the rotary member and the bars, and means for rotating the rotary member.

9. The combination with a pair of spiral track members, of a rim adapted to travel on said track members, a rotary member located between the track members, a link connecting the rotary member and the rim, and means for rotating the rotary member.

10. The combination with a pair of spiral track members, of a rim adapted to travel on the spiral track members, a rotary nut having connection with the rim to cause the rim to travel on the track members, and a screw movable axially through the nut.

11. The combination with the rim and a mounting for the same permitting it to move in a spiral direction, of a rotary nut connected to the rim to cause the rim to move on its mounting and a screw movable axially within the nut to cause the latter's rotation.

12. The combination of a pair of axially-movable screws, a connection between the screws for causing them to move simultaneously in opposite directions, a pair of pulleys having rims adapted to travel in a spiral direction, a rotary nut for each pulley receiving rotation from one of the screws, and connection between each nut and one of the rims.

13. The combination with a pair of disks, each having a hollow bearing and a spiral groove, of a rim adapted to travel in said groove, a screw having an axially-interrupted portion and movable axially within the hollow bearings, a key connecting the two disks and extending through the hollow bearings and preventing the turning of the screws, a nut surrounding the screw between the disks, and connection between the nut and the rim.

14. The combination with a pair of disks, each having a hollow bearing and a spiral groove, of a rim adapted to travel in said groove, a screw having an axially-interrupted portion and movable axially within the hollow bearings, a key connecting the two disks and extending through the hollow bearings and preventing the turning of the screws, a nut surrounding the screw between the disks, and a link connection between the nut and the rim.

15. The combination with the spiral track members, of bars traveling on said members and gradually increasing in height from the outer end of the spiral and means for causing the bars to travel on the track members.

16. The combination with the spiral track members, of bars traveling on said members and gradually increasing in height from the outer end of the spiral, the inner bars being convex on their outer faces, and a continuous expansible rim secured to said bars and means for causing the bars to travel on the track members.

17. The combination of a pair of members, each having a spiral track thereon, the distance between the portions of each spiral track gradually diminishing toward the center, and a rim movable on the spiral tracks.

The foregoing specification signed at Cincinnati this 1st day of July, 1905.

RICHARD E. ROSEWARNE.

In presence of—
D. C. KELLEY,
E. H. FISHER.